(12) United States Patent
Klein et al.

(10) Patent No.: US 10,162,654 B2
(45) Date of Patent: *Dec. 25, 2018

(54) NETWORK POLICY IMPLEMENTATION WITH MULTIPLE INTERFACES

(71) Applicant: Amazon Technologies, Inc., Seattle, WA (US)

(72) Inventors: Matthew D. Klein, Seattle, WA (US); Michael David Marr, Monroe, WA (US); Samuel J. McKelvie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/968,625

(22) Filed: Dec. 14, 2015

(65) Prior Publication Data
US 2016/0170782 A1 Jun. 16, 2016

Related U.S. Application Data

(63) Continuation of application No. 13/536,006, filed on Jun. 28, 2012, now Pat. No. 9,213,564.

(51) Int. Cl.
*G06F 15/173* (2006.01)
*G06F 9/455* (2018.01)

(52) U.S. Cl.
CPC ...... *G06F 9/45533* (2013.01); *G06F 9/45558* (2013.01); *G06F 2009/45575* (2013.01); *G06F 2009/45595* (2013.01)

(58) Field of Classification Search
CPC .................... G06F 9/45533; G06F 9/45558

USPC .......................................................... 709/226
See application file for complete search history.

(56) References Cited

U.S. PATENT DOCUMENTS

| | | | |
|---|---|---|---|
| 6,345,241 B1* | 2/2002 | Brice .................. | G06F 9/45558 703/21 |
| 8,151,262 B2* | 4/2012 | Challener ............... | G06F 21/57 713/164 |
| 8,539,493 B1* | 9/2013 | Robertson ............. | G06F 9/4881 718/103 |
| 9,292,466 B1* | 3/2016 | Vincent ................... | G06F 15/16 |
| 9,354,983 B1* | 5/2016 | Yenamandra ....... | G06F 11/1464 |
| 2004/0136379 A1* | 7/2004 | Liao ........................ | H04L 47/10 370/395.21 |
| 2007/0261082 A1* | 11/2007 | Ji ........................ | H04N 21/2662 725/62 |

(Continued)

*Primary Examiner* — Anthony Mejia
(74) *Attorney, Agent, or Firm* — Knobbe, Martens, Olson & Beat, LLP

(57) ABSTRACT

The transmission of data on computer networks according to one or more policies is disclosed. A policy may specify, among other things, various parameters which are to be followed when transmitting initiating network traffic. Multiple network interfaces may be installed on a server to enable transmission of data from the single server according a number of discrete configuration settings implicated by the various policies. The multiple network interfaces may correspond to separate physical components, with each component configured independently to implement a feature of a policy. The multiple network interfaces may also correspond to a single physical component that exposes multiple network interfaces, both to the network and to the server on which it is installed.

20 Claims, 6 Drawing Sheets

(56) References Cited

U.S. PATENT DOCUMENTS

| | | | |
|---|---|---|---|
| 2009/0183180 A1* | 7/2009 | Nelson | G06F 9/45533 719/319 |
| 2010/0070970 A1* | 3/2010 | Hu | G06F 9/45533 718/1 |
| 2010/0275205 A1* | 10/2010 | Nakajima | G06F 9/45558 718/1 |
| 2011/0197190 A1* | 8/2011 | Hattori | G06F 9/30076 718/1 |
| 2011/0314085 A1* | 12/2011 | Koronthaly | G06F 17/3056 709/203 |
| 2012/0131662 A1* | 5/2012 | Kuik | G06F 9/45558 726/11 |
| 2013/0132607 A1* | 5/2013 | Sinha | H04L 45/00 709/238 |
| 2013/0139153 A1* | 5/2013 | Shah | G06F 9/45558 718/1 |
| 2013/0139154 A1* | 5/2013 | Shah | G06F 9/45558 718/1 |
| 2013/0318228 A1* | 11/2013 | Raja | G06F 3/0635 709/224 |

* cited by examiner

NETWORK POLICY IMPLEMENTATION WITH MULTIPLE INTERFACES

CROSS-REFERENCE TO RELATED APPLICATION

This application is a continuation of U.S. patent application Ser. No. 13/536,006, entitled NETWORK POLICY IMPLEMENTATION WITH MULTIPLE INTERFACES, and filed Jun. 28, 2012, the entirety of which is incorporated by reference herein.

BACKGROUND

Generally described, computing devices utilize a communication network, or a series of communication networks, to exchange data. Companies and organizations operate computer networks that interconnect a number of computing devices to support operations or provide services to third parties. Data communicated between the computing networks originates from a network interface of a transmitting computing device and travels over the computing network. The data is then received at a network interface corresponding to a destination computing device. To facilitate the transmission of the data through the computing network, the data can be broken down into a series of packets. The serialized packets are then received and re-transmitted by switches and routers until the set of packets (e.g., the data) is received at the appropriate destination.

In a simple embodiment, a computing device, such as a server computing device, may have a single network interface, typically implemented as a network interface card ("NIC") that receives and transmits data. In more complex embodiments, a server may have multiple network interfaces in order to, for example, increase available bandwidth by adding additional network cables on which to transmit and receive network communications. For example, a server may support multiple NICs. In another example, a server may have a single NIC that supports multiple network interfaces, which is generally referred to as a multi-interface NIC. One example of a multi-interface NIC is a single root I/O virtualization ("SR-IOV") NIC. SR-IOV NICs typically include a single full-featured hardware network interface, known as a physical function, and several lightweight network interfaces, known as virtual functions. Together, the physical function and virtual functions are presented as separate network interfaces, both to other computing devices and to the operating system(s) executing on the computing device with the SR-IOV NIC.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
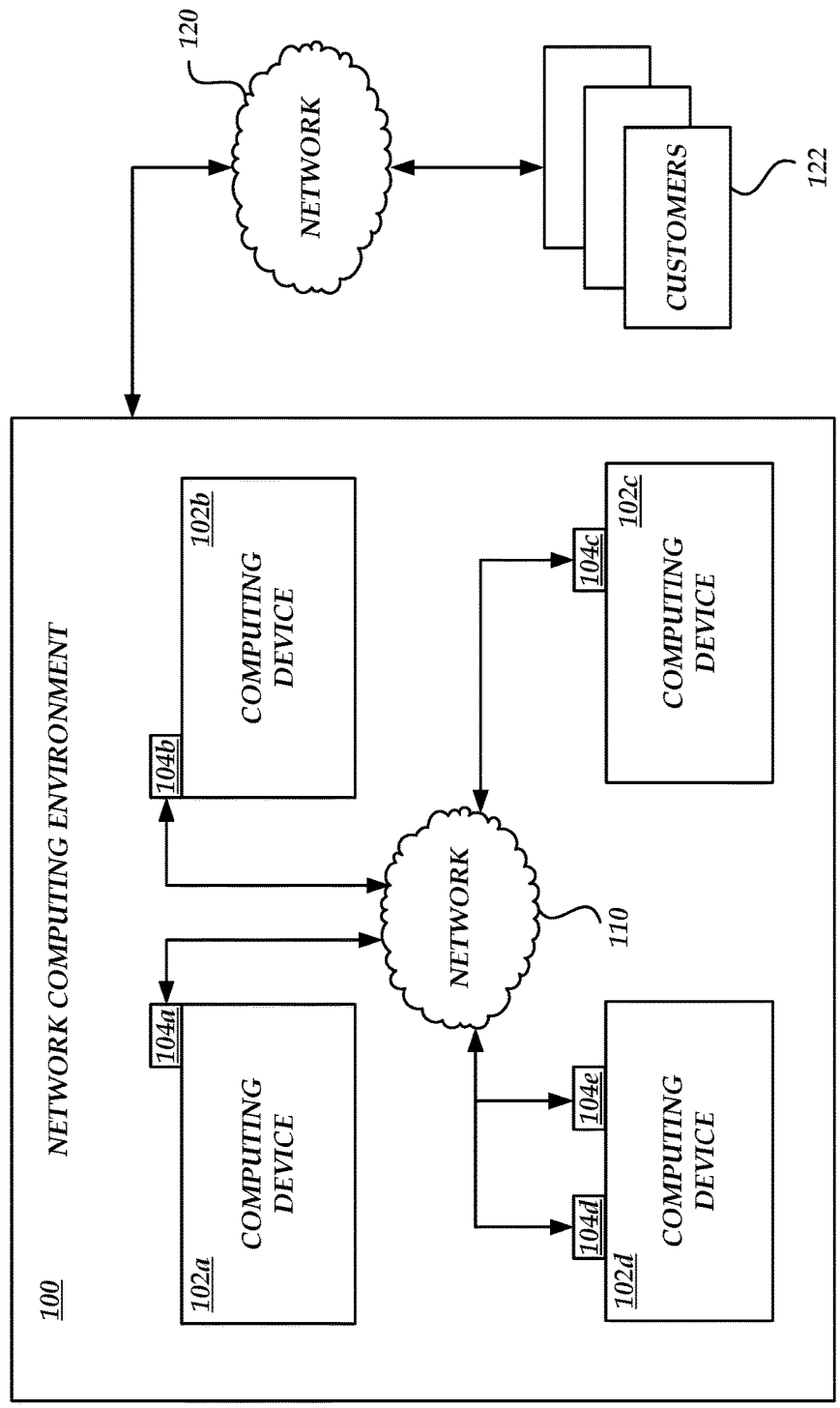
FIG. 1 is a block diagram of an illustrative network computing environment, including a number of computing devices, in which multiple network interfaces may be implemented.

Generally described, the present disclosure relates to implementation of computer networking features. Specifically, aspects of the disclosure relate to the transmission of data on computer networks according to one or more policies. Illustratively, a policy may specify a desired network performance characteristic, such as high bandwidth or low latency. Policies may be mapped to specific configuration settings, such as a maximum size of network packets to be transmitted, whether interrupt coalescing is to be used, whether to implement bandwidth throttling, and the like. For example, a server may be configured to transmit data within the data center and also over the Internet to external recipients. The two different types of traffic may be subject to different policies, including maximum packet size and bandwidth throttling.

In some embodiments, multiple network interfaces may be installed on a server to enable transmission of data from the single server according a number of discrete configuration settings implicated by the various policies. Illustratively, the multiple network interfaces may correspond to separate physical devices, with each device configured independently to implement a feature of a policy. Additional aspects of the disclosure relate to the use of a single physical component that exposes multiple network interfaces, both to the network and to the server on which it is installed. The multiple network interfaces exposed by such a component may also be configured to implement various network features in support of the assigned policies. Each network interface, regardless of whether it is located on a separate physical device from other network interfaces or co-located on a single physical device with other network interfaces, may correspond to a network hardware queue. Each network hardware queue may be associated with one or more corresponding software queues, and the network hardware and software queues may be configured, separately or together, with various settings to implement desired network policies.

Although aspects of the embodiments described in the disclosure will focus, for the purpose of illustration, on relationships and interactions between data center components, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative embodiment, a server in a data center may be configured to host a number of virtual machines. Each virtual machine may be configured to communicate over the data center network according to multiple policies. Polices may specify, among other things, desired network characteristics such as high bandwidth or low latency. The policies may correspond to specific configuration settings or other operating parameters, such as the maximum transmission unit (MTU) of network packets, whether interrupt coalescing is enabled, whether and to what extent bandwidth throttling is utilized, quality of service parameters, and the like. For example, a policy specifying a low latency network may be satisfied, at least in part, by turning off interrupt coalescing, while a policy specifying high bandwidth bay be satisfied, at least in part, by utilizing interrupt coalescing. The specific configuration settings used to implement a policy may depend on the specific hardware and/or software available to the virtual machine. A specific configuration setting implemented on one computing device to satisfy a policy may have no effect or even hinder satisfaction of the same policy on a different computing device, on the same computing device under different operating environment conditions, etc. A resource management component, such as a hypervisor or operating system, can determine at the time the virtual machine is launched or at some time thereafter which configuration settings to implement in order to satisfy the desired policy.

One policy implemented with respect to a particular virtual machine or some set of virtual machines may be satisfied by a network configuration setting indicating that control plane traffic is to be transmitted at an MTU of 1,500 bytes, while data plane traffic may be transmitted at an MTU of 9,000 bytes. While such a policy may be implemented in software, software implementations are generally inefficient, particularly when compared offload segmentation provided by hardware network interfaces. Therefore, the server may have multiple network hardware queues, each with a different configuration. In the present example, a first hardware queue may be configured to transmit data at an MTU of 1,500 byes, and a second hardware queue may be configured to transmit data at an MTU of 9,000 bytes. Accordingly, data plane traffic originating from the virtual machine may be transmitted via the second hardware queue, while control plane traffic may be handled by the first hardware queue.

FIG. 1 illustrates an example network computing environment 100 in which multiple independently configured network interfaces may be used to implement or enforce network policies. An independently configured network interface may include a network hardware queue which facilitates transmission and receipt of data via a medium, such as a network cable. A network hardware queue may have any number of configuration settings, as described in detail herein, some or all of which may be dynamically configurable. In some embodiments, a network hardware queue may be associated with a software queue that facilitates dynamic configuration of some or all configuration settings of its corresponding hardware queue. Optionally, a software queue may provide dynamic configuration of a setting that is not configurable or present in its corresponding hardware queue, and vice versa. These various network hardware queues and software queues, either alone or in combination, may be referred to as independently configured network interfaces or, more generally, as network interfaces.

Network computing environments such as the one illustrated in FIG. 1 may be implemented in data centers and other environments in which several computing devices 102 communicate with each other over a network 110. For example, an entity may operate one or more data centers which provide computing and storage services to internal or external customers 122. As described in more detail below, each customer 122 may connect to computing devices 102 within the network computing environment 100 to initiate computing processes, in some cases causing the establishment of connections between computing devices 102. While the present disclosure will focus, for purposes of illustration only, on the operation of a network computing environment 100 providing computing services to external or internal customers 122 through the use of virtual machines, the systems and processes described herein may apply to any implementation of a network computing environment 100, including one with no separate customer 122 entities or no virtual machine usage.

The network computing environment 100 may include any number of computing devices 102. Each computing device 102 can have one or more network interfaces 104 to facilitate communication with other computing devices 102 over a network 110. The network 110 may be a local area network (LAN), wide area network (WAN), some other network, or a combination thereof. In addition, the network computing environment 100 may connect to another network 120, such as a corporate or university network, or a collection of networks operated by independent entities, such as the Internet. Customers 122 of the network computing environment 100 may communicate with computing devices 102 over the combination of the networks 120, 110. In some embodiments, the customers 122 may cause a computing device 102 to launch a virtual machine instance to execute various computing operations for or on behalf of the customer 122. Any number of virtual machine instances may be running on a single computing device 102 at a given time. In addition, the various virtual machines running on a computing device 102 may be associated with a single customer 122 or with a number of different customers 122.

In some embodiments, the network 110 may be a combination of a substrate network on which any number of overlay networks may operate. As will be appreciated by one of skill in the art, network cables and switches may physically connect the various computing devices 102 through their respective network interfaces 104, and a number of different protocols may be implemented to facilitate communication over the physical infrastructure (e.g., IP over Ethernet, InfiniBand, etc.). Overlay networks may be implemented on top of the substrate network and may operate at a higher layer of the network model. Overlay networks facilitate, among other things, abstraction from the specifics of the substrate network. Policies regarding the operation of an overlay network, subnets, the network 110 as a whole, or some other portion of the network 110 may be implemented for a variety of reasons, such as to provide a specific feature or network characteristic, or to guarantee a certain level of service to a customer 122.

Providing varied network services and features concurrently on the same hardware presents several challenges. One challenge, among others, is that the network interfaces 104 of computing devices 102 may support only one configuration at a time, and may not have the capability to be dynamically reconfigured based on the momentary needs of a program, operating system, or virtual machine. As a result, a computing device 102 may be limited to providing only those features that are supported by its network interface 104. Unsupported features may be provided in software, such as by modifying the network interface driver or providing the functionality in the hypervisor or operating system. However, implementing features such as packet segmentation, bandwidth throttling, and the like in software can introduce additional challenges and further degrade performance.

One solution, among others, is to add multiple independently configured network interfaces 104 to a single computing device 102. Advantageously, this allows a variety of features to be made available to the programs, operating systems, and virtual machines executing on the computing device 102 while avoiding the inefficiencies and performance degradation of software solutions.

Illustratively, with reference to FIG. 1, a computing device 102d may communicate with computing devices 102b and 102c. Computing device 102b may be part of a subnet with a different, lower maximum transmission unit (MTU) than computing device 102d, and computing device 102c may be part of a subnet with a still lower MTU. Traditionally, the computing device 102d could ensure that its transmitted packets satisfied the differing MTUs by either (a) utilizing a network interface 104d configured to segment packets to the lowest of the applicable MTUs, (b) segmenting the packets according to the destination subnet MTU in software prior to employing the network interface 104d to transmit the packets, or (c) transmitting packets which may exceed the MTU of the receiver's subnet, thereby forcing the intermediary network components, such as routers, or the receiving computing device 102b, 102c itself to segment the packets. As described above, the software solution may cause inefficiencies and performance degradation. In addition, relying on the receiver or the intermediary network components to enforce the MTU may expose those devices to potential denial of service (DoS) attacks by tying up resources during packet segmentation. By instead utilizing multiple network interfaces 104d, 104e configured to transmit at different MTUs, the computing device 102d can leverage the more efficient hardware segmentation provided by the network interfaces 104d, 104e and transmit segmented packets to computing devices 102b, 102c which do not exceed the corresponding MTUs of the subnets of which they are a part.

In another embodiment, one virtual machine executing on a computing device 102d may utilize interrupt coalescing or implement a policy in which it is desirable to utilize interrupt coalescing, while another virtual machine executing on the same device 102d may not. Interrupt coalescing allows multiple packets to be received before generating an interrupt. For example, a received packet may be queued and the interrupt may be delayed for a length of time (e.g., x microseconds) or until a threshold number of subsequent packets arrive (e.g., x packets). In some cases, interrupt coalescing is a discrete configuration setting of the network interface and may not be dynamically switched on or off depending on the momentary needs of the programs, operating systems, and virtual machines of the computing device 102d. Separate network interfaces 104d, 104e can be provided on a single computing device 102d, with network interface 104d implementing interrupt coalescing while network interface 104e does not. The separately configured network interfaces 104d, 104e allow the programs, operating systems, virtual machines, etc. executing on the computing device 102d to utilize either interrupt coalescing setting concurrently.

Further features may be provided by implementing multiple independently configured network interfaces, including quality of service guarantees, bandwidth throttling and capping, and the like. The techniques disclosed and claimed are not limited to the example embodiments described herein.

The multiple independently configured interfaces 104d, 104e implemented on computing device 102d may be separate physical network interfaces, such as separate physical network interface cards ("NICs") each with its own queue for packets. In some embodiments, multiple network interfaces may be implemented within a single physical NIC 104a. For example, single root I/O virtualization ("SR-IOV") NICs provide a number of secondary queues in addition to a primary queue of the network interface. The primary queue is referred to as a physical function, and the secondary queues are referred to as virtual functions. Together, the physical function and virtual functions are presented as separate network interfaces, both to other computing devices and to the programs, operating systems, and virtual machines executing on the computing device with the SR-IOV NIC.

As will be described in detail below, each independently configured network interface, whether a separate NIC or a virtual function of a single SR-IOV NIC, may be assigned to a different virtual machine operating on a computing device. Therefore, multiple virtual machines on a single computing device may take advantage of discrete sets of traditionally mutually exclusive features. In some embodiments, one or more virtual machines may be associated with multiple network interfaces. Additionally, in some embodiments the various network interfaces may be pooled and made available to each virtual machine as various features are needed. The pooling may be managed by a resource management component, such as a hypervisor or operating system, and may be transparent to the virtual machines. In further embodiments, a computing device does not execute virtual machines. In such cases, the multiple network interfaces are made available to the processes executing on the computing in a fashion similar to that described herein with respect to virtual machines.

Figure 2A:
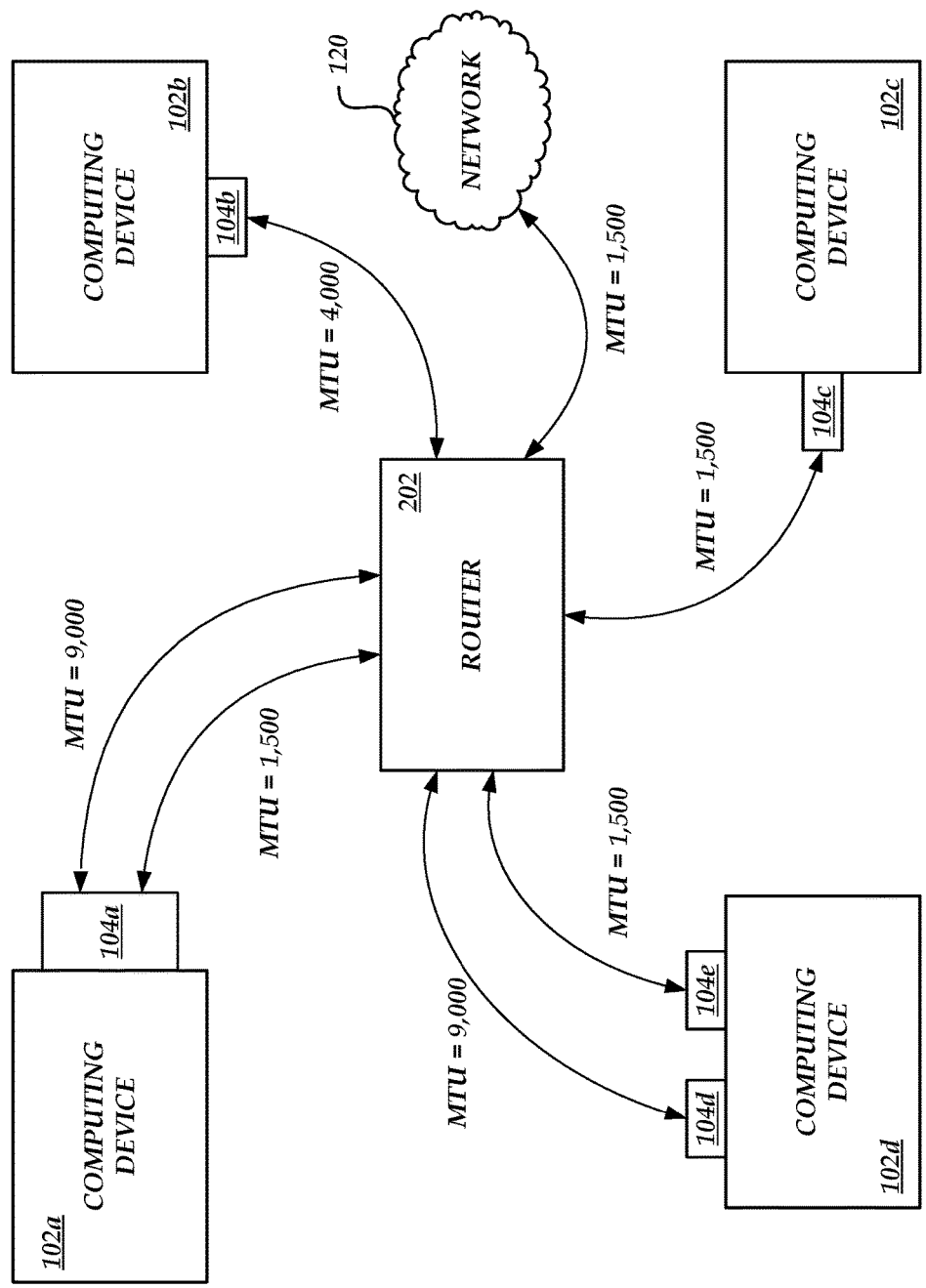
FIG. 2A is a block diagram of several illustrative interactions between computing devices utilizing multiple network interfaces to implement different maximum transmission units.

Turning now to FIG. 2A, example interactions between computing devices, some of which implement multiple network interfaces, will be described in greater detail. Specifically, network transmissions of varying sizes between computing devices 102a, 102b, 102c, 102d, which may be located on subnets with a different MTUs, will be described. Computing device 102a may have an SR-IOV network interface 104a with two virtual functions configured to transmit data across the network at an MTU of 1,500 bytes (e.g., standard Ethernet V2 frames) and 9,000 bytes (e.g., Ethernet jumbo frames). Computing device 102b may have a single NIC 104b configured to transmit data with an MTU of 4,000 bytes. Computing device 102c may have a single NIC 104c configured to transmit data with an MTU of 1,500 bytes. Computing device 102d may be configured with two NICs 104d, 104e. NIC 104d may be configured to transmit data with an MTU of 9,000 bytes, while the other NIC 104e may be configured to transmit data with an MTU of 1,500 bytes.

Communications from computing device 120a to computing device 102b or 102c may be transmitted by the 1,500 byte virtual function of the SR-IOV network interface 104a. If the virtual machine initiating the transmission prepares a large packet of data for transmission, such as a 64 kilobyte packet, segmentation of the packet can be offloaded to a virtual function rather than performing the segmentation in software. The virtual function can efficiently segment the packet into a number of smaller packets no larger than 1,500 bytes for transmission to computing devices 102b, 102c. Note that although computing device 102b is located on a 4,000 byte subnet, the two virtual functions available to virtual machines of the computing device 120a implement segmentation to either 9,000 bytes or 1,500 bytes. Segmentation into 4,000 byte packets would be done in software, such as by the SR-IOV NIC 104a driver, and then transmitted by the virtual function configured to transmit at a maximum of 9,000 bytes. By utilizing the segmentation offload provided by the virtual function instead of software segmentation, the entire transmission may be more efficient even though the packets are segmented into a larger number of smaller packets.

Communications from computing device 102b to computing device 102c may not take advantage of offloading segmentation to the NIC 104b. The NIC 104b is configured to transmit packets at an MTU of 4,000 bytes, so segmentation of larger packets may be offloaded to the NIC 102c only for segmentation into 4,000 byte packets. However, 4,000 byte packets are larger than the 1,500 byte MTU subnet of the computing device 102c. Therefore, the router 202 may segment the packets into a maximum of 1,500 bytes before transmitting them to the computing device 102c. Alternatively, software segmentation may be implemented by the computing device 102b, as described above. Either implementation is not as efficient as segmentation offload provided by a network interface.

Communications from computing device 102c to computing device 102d may be sent to either of the computing device's 102d two NICs 104d, 104e. In order to direct traffic at a particular NIC 104d or 104e, the two NICs 104d, 104e may be configured with different media access control (MAC) addresses and different IP addresses (assuming an IP substrate or overlay network is in use) so that the router 202 can forward the packets to the appropriate NIC 104d, 104e. In some embodiments the two NICs 104d, 104e may be configured with only different MAC addresses, as in the case of an InfiniBand substrate network.

Communications between device 102a and 102d may again be transmitted by either network interface to a compatible network interface (packets from the 1,500 byte virtual function of network interface 104a to either network interface 104d, 104e; packets from network interface 104d to the 9,000 byte virtual function of network interface 104a, etc.). In addition, both computing devices 102a, 102d can initiate different types of network traffic from the independently configured network interfaces. For example, the computing device 102a may send control plane traffic to the router 202 from the 1,500 byte MTU virtual function, while sending data plane traffic from the 9,000 byte virtual function, through the router 202, and finally to the computing device 102d. In another example, a virtual machine operating on computing device 102a on behalf of a customer 122 may communicate with computing devices of the customer 122 via the internet 120. The computing device 102a can send traffic via the internet 120 from the 1,500 byte MTU virtual function, while initiating traffic from the 9,000 byte MTU virtual function to other computing devices of the network computing environment 100.

As described above, the various virtual functions of an SR-IOV network interface 104a may be presented as separate network interfaces to the devices of the network, and to the virtual machines of the computing device 102a itself. In order to direct traffic at a particular virtual function of the SR-IOV interface 104a, each virtual function may be configured with different media access control (MAC) addresses and different IP addresses so that the router 202 can forward the packets to the appropriate virtual function. In some embodiments the two NICs 104d, 104e may be configured with only different MAC addresses.

Figure 2B:
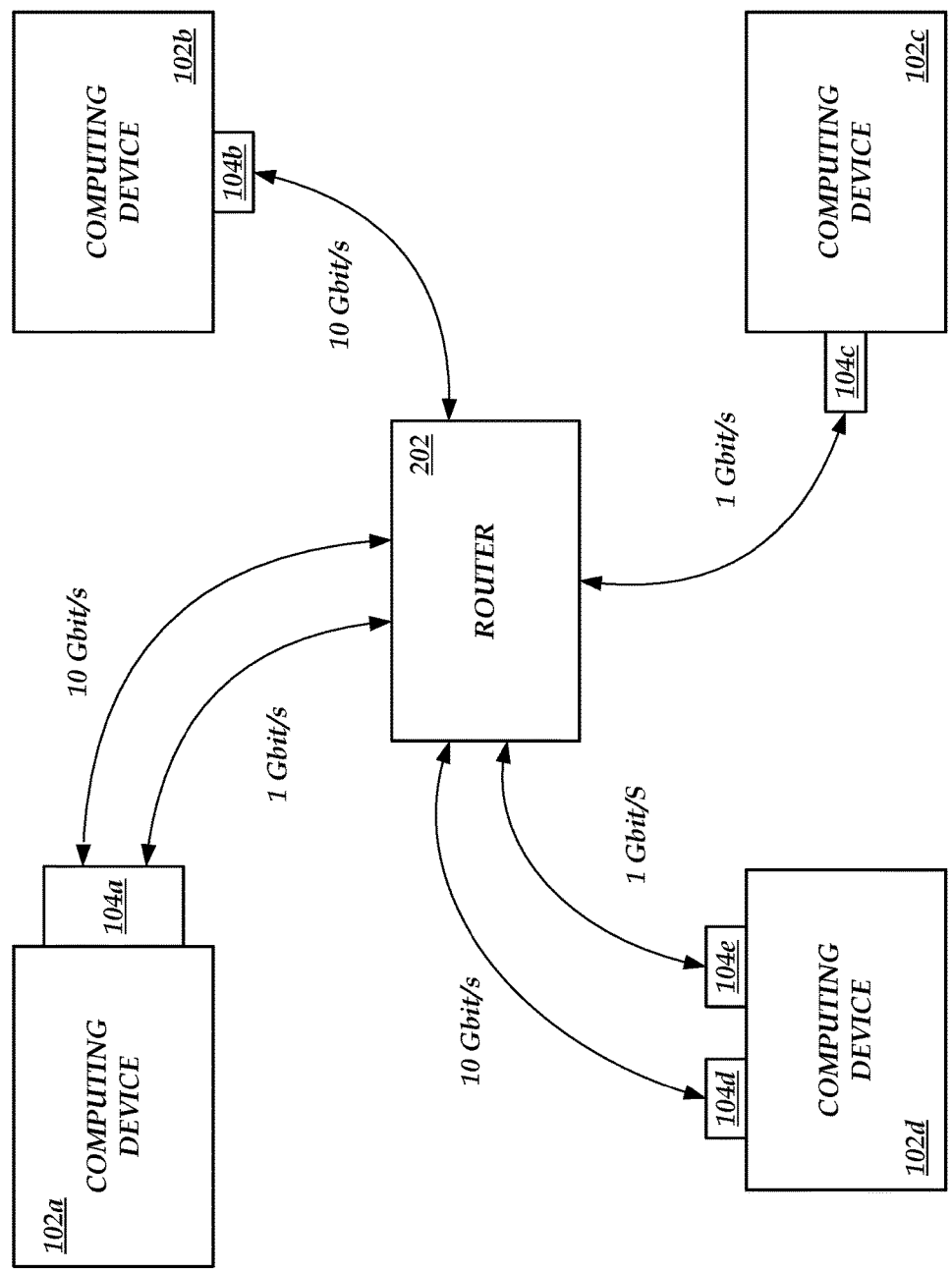
FIG. 2B is a block diagram of several illustrative interactions between computing devices utilizing multiple network interfaces to implement different bandwidth throttling policies.

FIG. 2B illustrates another network feature with discrete configuration settings implemented on the same hardware through the use of multiple network interfaces. The interactions illustrated in FIG. 2B result from bandwidth throttling. A single SR-IOV NIC may implement different bandwidth throttling settings in its various virtual functions. For example, the network interface 104a of computing device 104a may be an SR-IOV NIC with at least two virtual functions: one with bandwidth throttling implemented at 1 gigabit per second ("Gbit/s"), and another at 10 Gbit/s. Note that due to the use of a single physical NIC, there is only one network cable over which the independently throttled data is transmitted. In some embodiments, multiple physical NICs with different bandwidth throttling settings may be implemented on a single computing device. For example, computing device 102d may have at least two separate physical NICs: one (104d) with bandwidth throttling implemented at 10 Gbit/s, and another (104e) at 1 Gbit/s.

Figure 3:
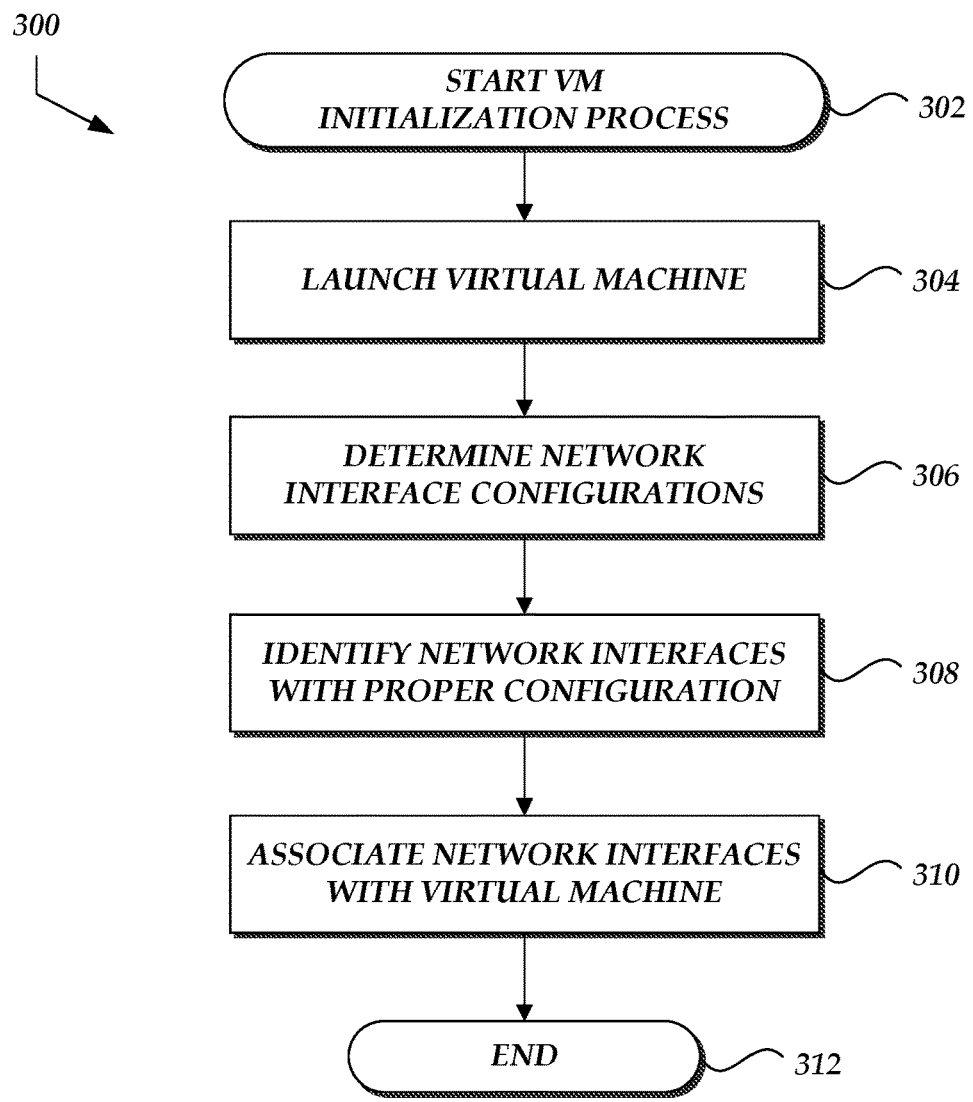
FIG. 3 is a flow diagram of an illustrative process for initializing a virtual machine and assigning it multiple independently configured network interfaces.

Turning now to FIG. 3, an example process 300 implemented by a computing device for associating one or more independently configured network interfaces with a newly launched virtual machine. The process 300 may be executed by a computing device 102 or some component thereof, such as an operating system or hypervisor. Advantageously, the hypervisor may select network interfaces based on configuration parameters associated with the virtual machine to be launched, thereby providing a set of features and services customized to a particular virtual machine even though other virtual machines associated with other discrete sets of features and services may already be executing on the computing device 102 or may subsequently be launched on the computing device 102.

The process 300 begins at block 302. The process 300 may be initiated upon receipt, by a computing device 102, of a notification, instruction, or other message indicating that a virtual machine instance is to be launched. For example, a customer 122 may connect to the network computing environment 100 and initiate a computing session. A notification to launch a virtual machine for the customer 122 may be sent to random or selected computing device 102. In some embodiments, each computing device 102 may be configured with network interfaces configured with a standard set of configuration settings. In such cases, a computing device 102 may be chosen randomly or based on load balancing considerations. In other embodiments, computing devices 102 may not have identically configured sets of network interfaces. In such cases, a computing device 102 may be chosen based on the needs of the customer's virtual machine.

Figure 4:
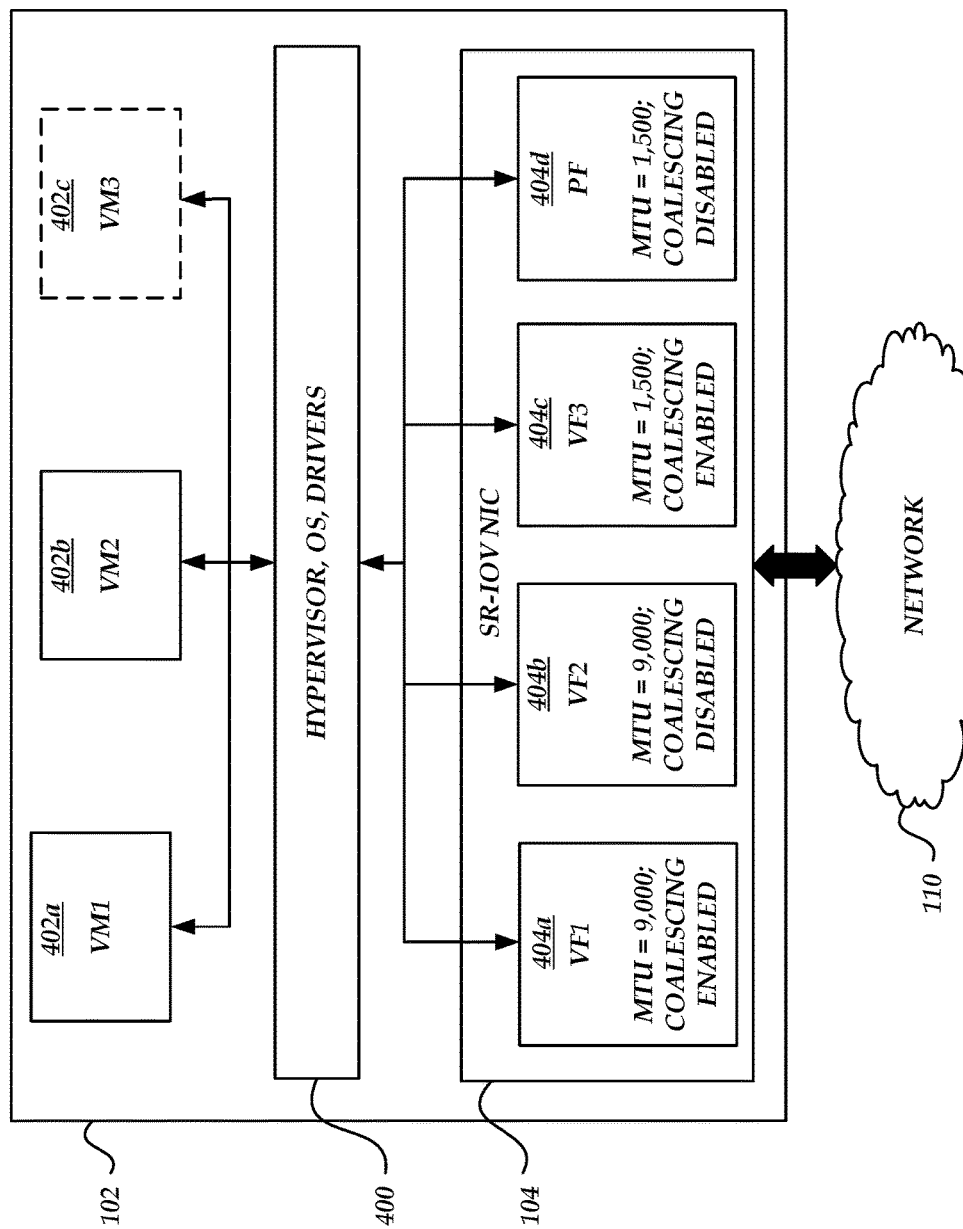
FIG. 4 is a block diagram of an illustrative computing device hosting virtual machines and implementing multiple independently configured network interfaces.

At block 304, the computing device 102, or some component thereof such as the hypervisor, may launch a virtual machine for the customer. The virtual machine may be launched from a standard virtual machine image or an image customized for or selected by the customer. For example, FIG. 4 illustrates an example computing device 102 configured with an SR-IOV NIC 104 having three independently configured virtual functions 404a, 404b, 404c and a physical function 404d. Two virtual machines 402a, 402b have been launched and are executing on the computing device 102. The hypervisor 400 can launch a third virtual machine 402c in response to receiving a notification to do so.

At block 306, the hypervisor 400 may determine the network interface configuration or configurations to provide for the newly launched virtual machine 402c. The hypervisor may have access to a repository of configuration information to consult when determining the network configurations to provide for virtual machines. In some embodiments, configuration information may be received with the notification to launch the virtual machine 402c, or from the virtual machine instance 402c itself, or from the image from which the virtual machine instance 402c was instantiated. For example, the hypervisor 400 may determine that the virtual machine 402c is to be provided with network interfaces which implement two separate policies. The hypervisor 400 can then determine which network configuration settings, when implemented on the available hardware, will satisfy each of the policies. In some cases, the configuration settings applied to two or more network interfaces may be mutually exclusive, such that a policy is satisfied by one network interface or another, but not by both. In the present example, the hypervisor 400 may determine that the two separate policies can be satisfied by two network interfaces: one interface configured to transmit at an MTU of 9,000 bytes and another interface configured to transmit at an MTU of 1,500 bytes. Both interfaces are to have interrupt coalescing disabled.

At block 308, the hypervisor 400 may identify which of the network interfaces 404a, 404b, 404c, 404d to associate with the newly launched virtual machine 402c. Returning to the example above, the hypervisor 400 may identify virtual function 2, 404b, and the physical function 404d as providing the configuration settings which are most likely, or have a likelihood exceeding a threshold, to satisfy the policies associated with the virtual machine 402c. In some embodiments, the hypervisor 400 or some other component can dynamically configure the network interfaces of the computing device 102 to satisfy the policies of the virtual machine 402c. For example, the hypervisor 400 may modify a configuration setting of a network hardware queue or its associated software queue in order to satisfy one or both policies. The hypervisor 400 may determine which configuration settings to identify or dynamically configure based on the current or predicted future operating environment of the virtual machine 402c, such as the number of other virtual machines expected to execute concurrently on the same computing device 102, the expected network traffic, and the like.

At block 310, the hypervisor 400 may associate the network interfaces identified in block 308 with the virtual machine 402c. In some embodiments, this may involve an exclusive assignment wherein the two identified network interfaces 404b, 404d may only be utilized by the assigned virtual machine 402c until the occurrence of some triggering event, such as the end of execution of the virtual machine 402c. In other embodiments the associations may not be exclusive. For example, the hypervisor 400 may provide a pool of network interfaces to multiple virtual machines, allowing two or more virtual machines to utilize a single network interface, or similarly two or more VMs may share utilization of two more network interfaces. After the virtual machine instance 402c has been associated with one or more network interfaces, it may transmit and receive data via the associated network interfaces. For example, application software running within the virtual machine instance 402c may select which network interface to utilize when transmitting data based on a policy associated with the data.

Figure 5:
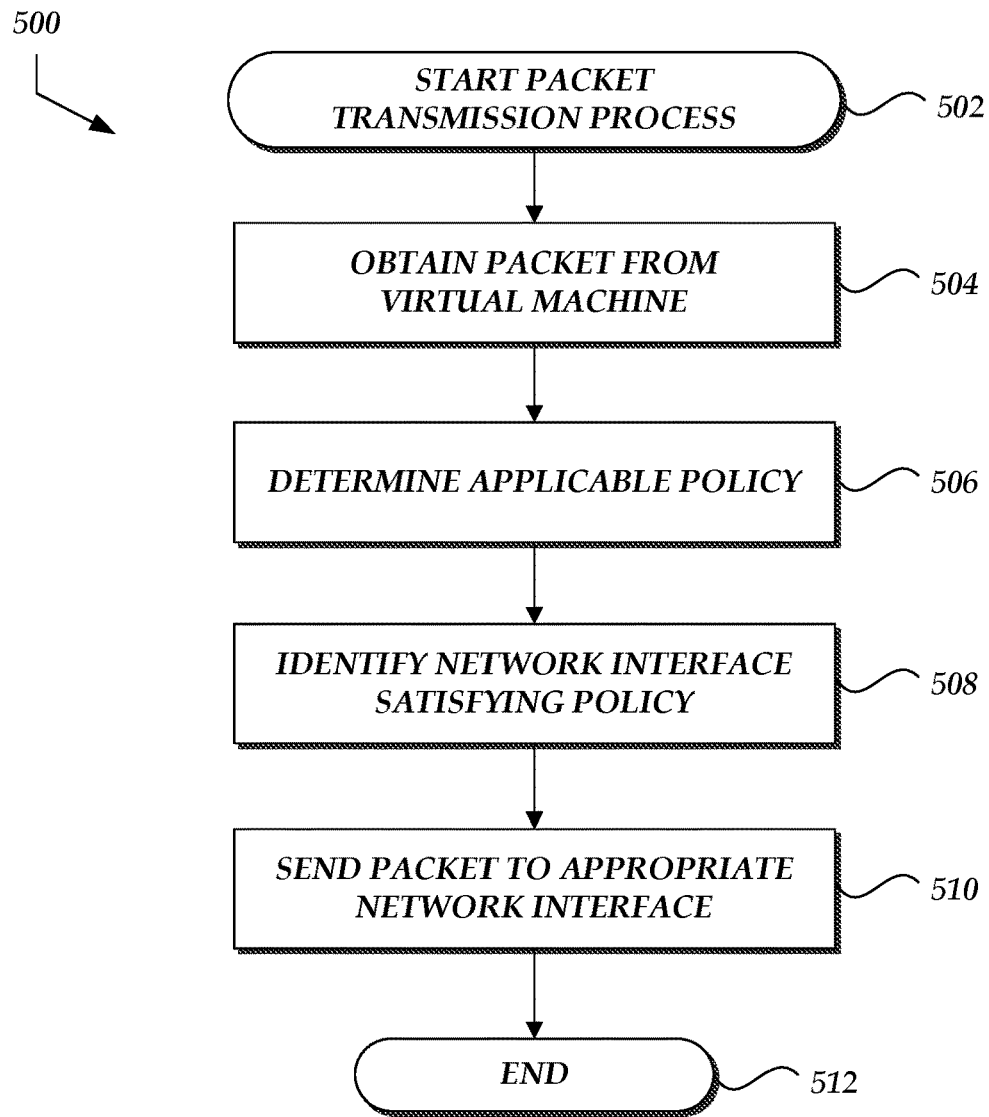
FIG. 5 is a flow diagram of an illustrative process for passing packets to an appropriate network interface to facilitate policy enforcement.

Turning now to FIG. 5, an example process 500 implemented by a computing device for initiating and receiving transmissions using multiple network interfaces will be described. The process 500 may be implemented by a component of a computing device 102, such as an operating system or hypervisor 400 as illustrated in FIG. 4, to determine which network interface to utilize when transmitting a packet. The process 500 thereby allows the operating systems, virtual machines, applications, and other modules which may be executing on the computing device to be shielded from specific details regarding network interface assignment and configuration. As a result, different network interfaces may be utilized to transmit and receive data for a virtual machine throughout the lifetime of the virtual machine without any persistent association of the virtual machine to any network interface, for example as described above with respect to FIG. 3. Alternatively, the hypervisor 400 can forward packets from the virtual machines 402a, 402b, 402c to an appropriate virtual function 404a, 404b, 404c or physical function 404d based on the assignments made by the process 300 described above and also based on characteristics of the packet itself, such as its size or destination.

The process 500 begins at block 502. At block 504, a component of a computing device 102, such as a hypervisor 400, receives a data packet. The packet may be received from a program, operating system, virtual machine, or other module or process executing on the computing device 102. For example, a virtual machine 402c may be executing computing operations on behalf of a customer. The computing operations may, at some point, include a network transmission. The virtual machine may create a data packet and pass the packet to the hypervisor 400 for forwarding to the appropriate network interface.

At bock 506 the hypervisor 400 determines whether a network policy is applicable to the transmission of the packet. If a network policy is applicable, the hypervisor 400 determines the specific policy requirements to enforce with regard to transmitting the packet. Returning to the example above, the virtual machine 402c may be associated with two different MTUs, depending on the type of network traffic initiated by the virtual machine. Control plane traffic to a router may be associated with a policy specifying an MTU of 1,500 bytes, while data plane traffic to be transmitted to other computing devices 102 within the network computing environment 100 may be associated with a policy specifying an MTU of 9,000 bytes. In the current example, the data packet may be a large 56 kilobyte packet to be transmitted to another computing device 102 within the network computing environment 100. The hypervisor 400 may therefore determine that the packet is to be transmitted at an MTU of 9,000 bytes.

At block 508 the hypervisor identifies a network interface implementing configuration settings satisfying the policy determined to apply to the transmission of the current packet. In the present example, the virtual machine 402c has been associated with virtual functions 404b and physical function 404d. As illustrated in FIG. 4, virtual function 404b is configured to transmit data at an MTU of 9,000 bytes and provides corresponding segmentation offload for that MTU. Physical function 404d is configured to transmit data at an MTU of 1,500 bytes and provides corresponding segmentation offload for that MTU. Among the two assigned network interfaces, only virtual function 404b satisfies the policy determined in block 506 above.

At block 510, the hypervisor 400 can forward the packet to the network interface identified in block 508. In the present example, the virtual function 404b is associated with the virtual machine 402c from which the packet originated, and it also satisfies the policy under which the packet is to be transmitted. In response to the determination, the hypervisor 400 can forward the packet to the physical function 404b. The physical function 404b segment the large 56 kilobyte packet in a number of smaller 9,000 byte packets for transmission to the destination computing device 102.

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented in application-specific hardware, or in software executed by hardware, depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing device comprising:
   a first network hardware queue associated with a first network configuration setting;
   a second network hardware queue associated with a second network configuration setting, wherein the first network configuration setting is distinct from the second configuration setting;
   a memory configured to store processor-executable instructions; and
   a processor configured with the processor-executable instructions to perform operations comprising:
      determining that a virtual machine executing on the computing device has initiated transmission of a data packet;
      in response to determining that the virtual machine has initiated transmission of the data packet:
         determining a network policy associated with the data packet;
         selecting a network hardware queue from one of the first network hardware queue or the second network hardware queue based at least partly on a configuration setting that satisfies the determined network policy; and
         causing the selected network hardware queue to transmit the data packet.

2. The computing device of claim 1, wherein the processor is configured with the processor-executable instructions to perform operations such that the network policy associated with the data packet comprises at least one of a desired bandwidth, a desired latency, a maximum transmission unit of network packets, an indication regarding enablement of interrupt coalescing, an indication regarding an extent to which bandwidth throttling is utilized, quality of service parameters, a size of the data packet, or a destination of the data packet.

3. The computing device of claim 1, wherein the processor is configured with the processor-executable instructions to perform operations further comprising modifying a configuration setting of a software queue associated with the first network hardware queue.

4. The computing device of claim 1, wherein the computing device further comprises:
   a first network interface card that comprises the first network hardware queue; and
   a second network interface card that comprises the second network hardware queue.

5. The computing device of claim 1, wherein the computing device comprises a network interface device comprising the first network hardware queue and the second network hardware queue.

6. The computing device of claim 5, wherein:
the network interface device is a single root input/output virtualization (SR-IOV) device;
the first network hardware queue corresponds to a physical function of the SR-IOV device; and
the second network hardware queue corresponds to a virtual function of the SR-IOV device.

7. A method implemented on a computing device, comprising:
determining that a virtual machine has initiated transmission of a data packet; and
in response to determining that the virtual machine operating on the computing device has initiated transmission of a data packet:
determining a network policy associated with the data packet;
selecting a network hardware queue from a first network hardware queue and a second network hardware queue based on matching a configuration setting with the determined network policy, wherein the first network hardware queue is associated with a first network configuration setting and wherein the second network hardware queue is associated with a second network configuration setting distinct from the first network configuration; and
causing the selected network hardware queue to transmit the data packet.

8. The method of claim 7, wherein determining a network policy associated with the data packet comprises determining, by a hypervisor operating on the computing device, the network policy associated with the data packet.

9. The method of claim 7, wherein determining a network policy associated with the data packet comprises:
receiving configuration information from the virtual machine; and
selecting, from among a plurality of network configurations, the network policy associated with the data packet based at least in part on the configuration information received from the virtual machine.

10. The method of claim 7, wherein selecting the network hardware queue from the first network hardware queue and the second network hardware queue further comprises:
determining that the first network hardware queue is associated with a configuration setting that satisfies the determined network policy; and
determining that the second network hardware queue is associated with a configuration setting that does not satisfy the determined network policy.

11. The method of claim 7 further comprising associating the selected network hardware queue with the virtual machine.

12. The method of claim 7, wherein the computing device further comprises:
a first network interface card that includes the first network hardware queue; and
a second network interface card that includes the second network hardware queue.

13. The method of claim 7, wherein the computing device comprises a network interface device comprising the first network hardware queue and the second network hardware queue.

14. The method of claim 7, wherein:
the network interface device is a single root input/output virtualization (SR-IOV) device;
the first network hardware queue corresponds to a physical function of the SR-IOV device; and
the second network hardware queue corresponds to a virtual function of the SR-IOV device.

15. A non-transitory, computer-readable medium having stored thereon computer-executable software instructions configured to cause a processor of a computing device to perform operations comprising:
determining that a virtual machine has initiated transmission of a data packet; and
in response to determining that the virtual machine operating on the computing device has initiated transmission of a data packet:
determining a network policy associated with the data packet;
selecting a network hardware queue from a first network hardware queue and a second network hardware queue based on a configuration setting that satisfies the determined network policy, wherein the first network hardware queue is associated with a first network configuration setting and the second network hardware queue is associated with a configuration setting distinct from the first network configuration; and
causing the selected network hardware queue to transmit the data packet.

16. The non-transitory, computer-readable medium of claim 15, wherein the network policy associated with the data packet comprises at least one of a desired bandwidth, a desired latency, a maximum transmission unit of network packets, an indication regarding enablement of interrupt coalescing, an indication of an extent to which bandwidth throttling is utilized, quality of service parameters, a size of the data packet, or a destination of the data packet.

17. The non-transitory, computer-readable medium of claim 15, wherein the processor is configured with the processor-executable instructions to perform operations further comprising modifying a configuration setting of a software queue associated with the first network hardware queue.

18. The non-transitory, computer-readable medium of claim 15, wherein the computer-executable software instructions are configured to cause a processor of a computing device to perform operations such that determining a network policy associated with the data packet comprises:
receiving configuration information from the virtual machine; and
selecting, from among a plurality of network configurations, the network policy associated with the data packet based at least in part on the configuration information received from the virtual machine.

19. The non-transitory, computer-readable medium of claim 15, wherein:
the configuration setting of the selected network hardware queue comprises one or more performance values;
the network policy associated with the data comprises a desired network performance characteristic; and
the one or more performance values satisfy the desired performance characteristic.

20. The non-transitory, computer-readable medium of claim 19, wherein the desired network performance characteristic relates to at least one of latency or bandwidth.

* * * * *